US008626904B1

(12) United States Patent
Olliff

(10) Patent No.: US 8,626,904 B1
(45) Date of Patent: Jan. 7, 2014

(54) DETECTING AND REPORTING LIVELOCKS IN A COMPUTER

(75) Inventor: Michael Anthony Olliff, Canyon Country, CA (US)

(73) Assignee: Symantec Corporation, Mountain View, CA (US)

( * ) Notice: Subject to any disclaimer, the term of this patent is extended or adjusted under 35 U.S.C. 154(b) by 272 days.

(21) Appl. No.: 13/044,453

(22) Filed: Mar. 9, 2011

(51) Int. Cl.
*G06F 15/173* (2006.01)

(52) U.S. Cl.
USPC .............. 709/224; 714/1; 714/48; 718/100

(58) Field of Classification Search
USPC .................... 709/224; 714/1, 48; 718/100
See application file for complete search history.

(56) References Cited

U.S. PATENT DOCUMENTS

| | | | | |
|---|---|---|---|---|
| 5,835,766 | A * | 11/1998 | Iba et al. ...................... | 718/104 |
| 5,845,117 | A * | 12/1998 | Fujita ............................ | 718/107 |
| 6,542,921 | B1 * | 4/2003 | Sager ............................ | 718/108 |
| 7,062,681 | B2 * | 6/2006 | Larsson et al. ................ | 714/39 |
| 7,249,179 | B1 * | 7/2007 | Romero et al. ............... | 709/226 |
| 7,516,362 | B2 * | 4/2009 | Connelly et al. .............. | 714/26 |
| 8,108,878 | B1 * | 1/2012 | Pulsipher ..................... | 718/106 |
| 8,250,131 | B1 * | 8/2012 | Pulsipher ..................... | 709/201 |
| 8,412,406 | B2 * | 4/2013 | Johnson et al. ............... | 701/33.1 |
| 2004/0172385 | A1 * | 9/2004 | Dayal ............................ | 707/3 |
| 2007/0033281 | A1 * | 2/2007 | Hwang et al. ................. | 709/224 |
| 2008/0065873 | A1 * | 3/2008 | Hall et al. ..................... | 712/245 |
| 2008/0313445 | A1 * | 12/2008 | Altman et al. ................ | 712/239 |
| 2009/0198969 | A1 * | 8/2009 | Nystad et al. ................. | 712/216 |
| 2009/0300644 | A1 * | 12/2009 | Lee et al. ...................... | 718/106 |
| 2011/0066908 | A1 * | 3/2011 | Bartz et al. .................... | 714/746 |

OTHER PUBLICATIONS

Ho, A. et al., "On Deadlock, Livelock, and Forward Progress," Technical Report, No. 633, University of Cambridge, May 2005, [Online] Retrieved from the Internet<URL:http://www.cl.cam.ac.uk/techreports/UCAM-CL-TR-633.pdf>.

Li, T. et al., "Spin Detection Hardware for Improved Management of Multithreaded Systems," IEEE Transactions on Parallel and Distributed Systems, Jun. 2006, pp. 508-521, vol. 17, No. 6, [Online] Retrieved from the Internet<URL:http://www.cs.duke.edu/~alvy/papers/tpds06_spinning.pdf>.

* cited by examiner

*Primary Examiner* — Duyen Doan
(74) *Attorney, Agent, or Firm* — Fenwick & West LLP

(57) ABSTRACT

Tasks executing on a computer can livelock. To detect a livelocked task, the amount of computing resources consumed by the task is sampled to determine whether the task is consuming an inordinate amount of resources. In addition, the task is examined to determine whether it is making tangible progress. This examination can include inspecting registers of a processor executing the task. If the task is livelocked, state data describing the livelock event is collected. The state data can include a memory dump describing the state of the livelocked task and data describing other tasks executing on the computer. A livelock report including the collected state data is generated and transmitted to a server.

20 Claims, 4 Drawing Sheets

DETECTING AND REPORTING LIVELOCKS IN A COMPUTER

BACKGROUND

1. Field of Art

The present invention generally relates to the field of computer performance monitoring and more specifically to detecting and reporting livelock events.

2. Background of the Invention

Modern computers can execute multiple applications simultaneously. While the computer has limited computing resources, the operating system allocates these resources among the executing applications so that each can perform its associated functions. For example, the computer may simultaneously execute a web browser, a messaging application, and a media player, all while a security application scans for malicious software in the background.

Occasionally, an application will enter a "livelock" state characterized by using a high amount of processor or other computer resources while providing no tangible progress. For example, the media player might inexplicably use 99% of available processor resources while failing to respond to user input or playing any media. The livelock condition degrades the performance of the computer. Not only does the livelocked application fail to make tangible progress, but the other applications executing on the computer may receive fewer resources and their performance can degrade as well. Accordingly, livelocks can be very frustrating to computer users.

Application developers strive to avoid livelocks in their products. However, livelocks still occur due at least in part to the wide variety of computing environments in which applications can run. An application that behaves properly on one type of computer hardware and operating system may livelock occasionally on other hardware and/or software. Thus, even if the developers receive anecdotal evidence that their applications are livelocking, the livelock events generally are not reproducible due to environmental, configuration, or data-related factors that are specific to the computing environments in which the livelocks occurred. Therefore, the developers are unable to determine why their applications livelock and find it difficult to improve this aspect of their products.

SUMMARY

The above and other issues are addressed by a method, computer-readable storage medium storing executable computer program modules, and a computer system that perform livelock detection on a computer. An embodiment of the method comprises detecting a livelock event involving a task executing on the computer and, responsive to detecting a livelock event, collecting state data describing the detected livelock event. Additionally, the method generates a livelock report including the collected state data and transmits the report to a server.

An embodiment of the computer-readable storage medium stores executable computer program instructions for reporting a livelock event occurring on a computer, the instructions performing steps comprising detecting a livelock event involving a task executing on the computer and, responsive to detecting a livelock event, collecting state data describing the detected livelock event. Additionally, the steps comprise generating a livelock report including the collected state data and transmitting the report to a server.

An embodiment of the computer system for reporting a livelock event comprises a non-transitory computer-readable storage medium storing executable computer program instructions for performing steps comprising detecting a livelock event involving a task executing on the computer and, responsive to detecting a livelock event, collecting state data describing the detected livelock event. Additionally, the steps comprise generating a livelock report including the collected state data and transmitting the report to a server. The computer system further comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures.

Figure 1:
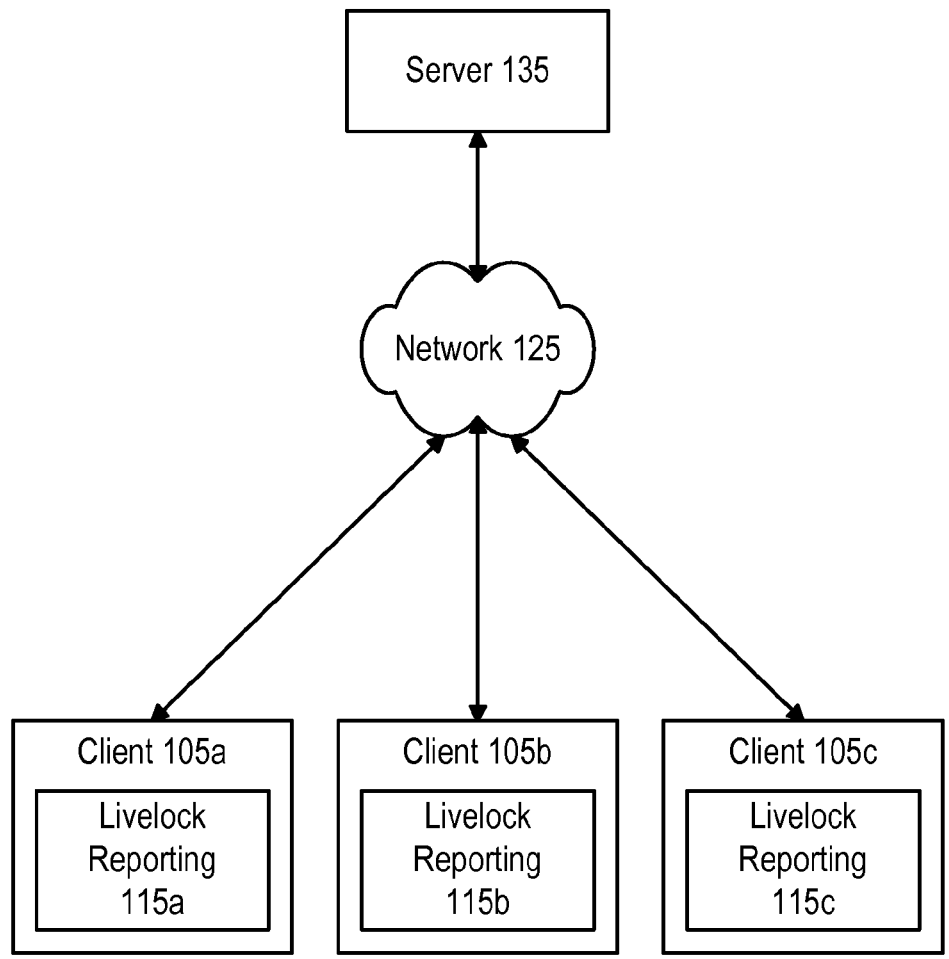
FIG. 1 is a high-level block diagram illustrating an environment for reporting livelock events according to one embodiment.

FIG. 1 is a high-level block diagram illustrating an environment 100 for reporting livelock events according to one embodiment. As shown, the environment 100 includes a network 125 connecting multiple clients 105 to a server 135. While only three clients 105 and one server 135 are shown in FIG. 1 for clarity, embodiments can have many clients 105 and multiple servers 135. FIG. 1 and the other figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral (e.g. "105" in the text refers to reference numerals "105a," "105b," and/or "105c" in the figures).

The client 105 is a computer or other electronic device used by one or more users to execute applications for performing various activities. For example, the client 105 can be a desktop, notebook, or tablet computer, a mobile telephone, or television set-top box. The applications executed by the client 105 may include web browsers, word processors, media players, spreadsheets, image processors, security software, etc.

Occasionally, one or more of the applications executed by the client 105 may enter a livelock state. The livelock is characterized by the application consuming an inordinate amount of computing resources without showing any tangible progress. For example, a livelocked application may consume 99% of available processor resources without producing any tangible results. The application may also become non-responsive to user input during the livelock, although this is not necessarily the case.

As shown in FIG. 1, the client includes a livelock reporting module 115 (the "reporting module") for detecting when an application enters a livelock state. Upon detecting such a livelock event, the reporting module 115 collects associated data describing the event, including data describing the state of the computer and the livelocked application, and transmits a livelock report containing the data to the server 135. In some embodiments the reporting module 115 is incorporated into an operating system executing on the client 105 while in other embodiments the reporting module 115 is a standalone application or part of another product.

The server 135 receives livelock reports from the reporting modules 115 of the clients 105. The server 135 aggregates and/or processes the data in the reports to provide information for identifying the causes of the livelocks. For example, the server 135 may store the reports in a relational or other type of database. The server 135 may then analyze the stored reports to identify the causes of the livelocks. For example, the server 135 can perform regression analysis using variables such as the livelocked application, computer hardware, applications executing when the livelocks occurred, data being processed when the livelocks occurred, and/or other variables described in the reports from the clients 105.

Application developers may use the results of the analysis to improve their applications and reduce the frequency of the livelock events. For example, the developer of an application can use the analysis performed by the server 135 to identify a bug or other fault in the application and update the application to resolve the issue. The update can be distributed to the clients 105 using the server 135 or via other distribution channels.

The network 125 represents the communication pathway between clients 105 and server 135. In one embodiment, the network 125 uses standard communications technologies and/or protocols and can include the Internet. Thus, the network 125 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 125 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 125 can be represented using technologies and/or formats including the hypertext markup language (HTML), the extensible markup language (XML), JavaScript, VBScript, FLASH, the portable document format (PDF), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 125 can use custom and/or dedicated data communications technologies instead of, or in addition to, the ones described above.

Figure 2:
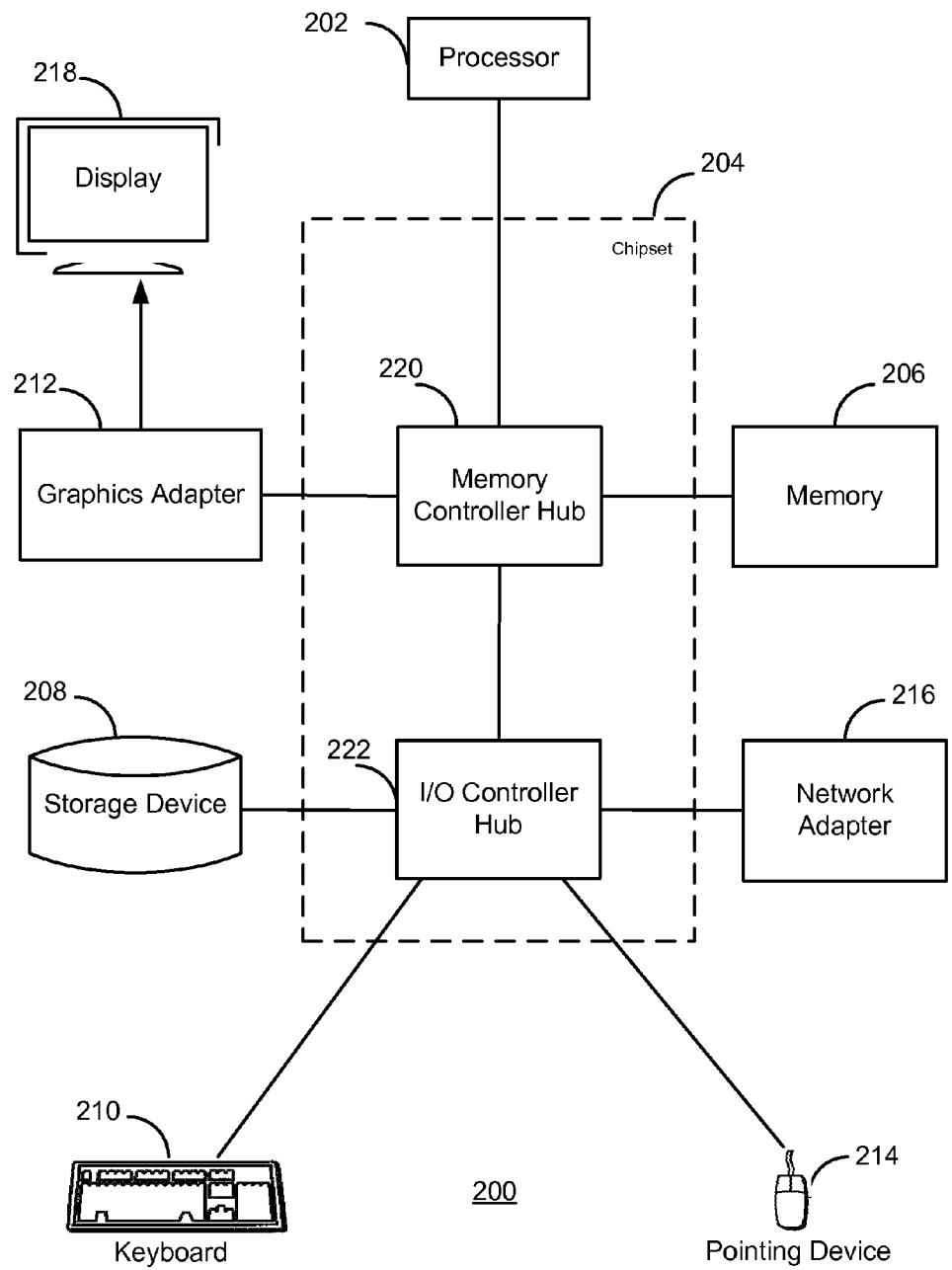
FIG. 2 is a high-level block diagram illustrating an example of a computer for use as a client and/or server according to one embodiment.

FIG. 2 is a high-level block diagram illustrating an example of a computer 200 for use as a client 105 and/or server 135 according to one embodiment. Illustrated are at least one processor 202 (CPU) coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 125. Some embodiments of the computer 200 have different and/or other components than those shown in FIG. 2. For example, the server 135 may be formed of multiple blade servers and lack a display device, keyboard, and other components.

As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202 as one or more processes. A process, in turn, is formed of one or more threads of execution. This description also uses the term "task" to refer to the execution of a process and/or thread by the processor 202.

The modules executed by the computer 200 include modules implementing the operating system and modules implementing applications. The operating system acts as an intermediary between the applications and the computer hardware. In addition, the operating system provides a variety of interfaces, including application programming interfaces (APIs) that modules can use to obtain state information about the computer 200.

The state information describes the configuration of the computer 200. The state information may describe, for example, the hardware configuration of the computer 200, tasks being executed by the computer, contents of the memory 208, values stored in registers of the processor 202, processor 202 time ("CPU time") consumed by one or more tasks, the elapsed real time execution of one or more tasks, a task owner (e.g. program module, system or user), and/or other data associated with the execution of a task or operation of the computer 200. The state information changes over time as the computer 200 processes data.

Figure 3:
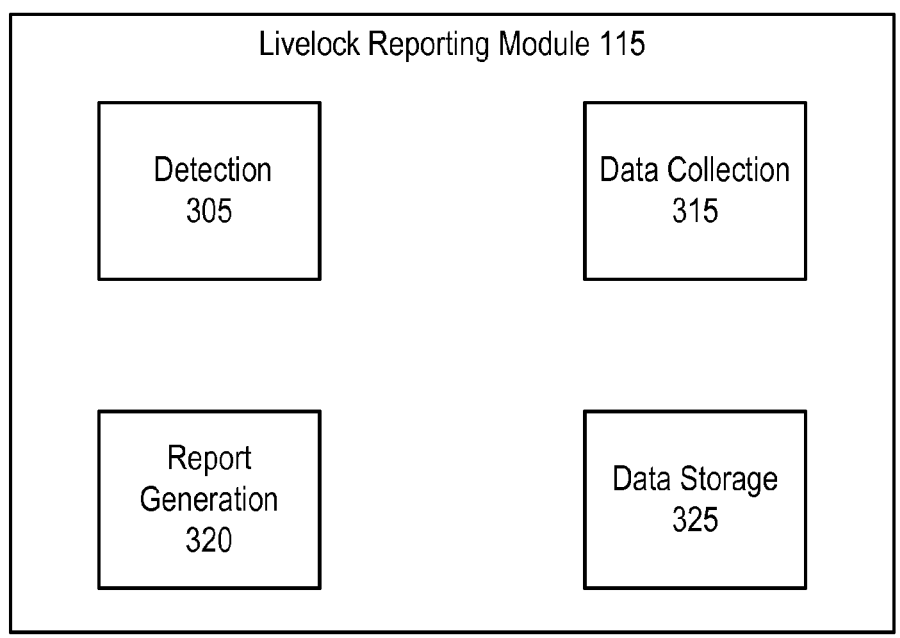
FIG. 3 is a high-level block diagram illustrating a detailed view of the reporting module of a client according to one embodiment.

FIG. 3 is a high-level block diagram illustrating a detailed view of the reporting module 115 of a client 105 according to one embodiment. As shown in FIG. 3 the reporting module 115 itself includes multiple modules. In the embodiment shown in FIG. 3, the reporting module 115 includes a detection module 305, a data collection module 315, a report generation module 320, and a data storage module 325. In some embodiments, the functions are distributed among the modules in a different manner than described herein. In addition, other embodiments have additional and/or other modules.

The detection module 305 detects livelock events. As mentioned above, a livelock event is characterized by a task of a process or thread consuming an inordinate amount of computing resources without making tangible progress. To detect livelocks, an embodiment of the detection module 305 uses one or more APIs provided by the operating system to obtain state information about the client 105. The detection module 305 analyzes the state information to determine whether tasks executing on the client 105 are in a livelock state. Depending upon the embodiment, the detection module 305 may be configured to determine whether any tasks on the client 105 are livelocked, or whether any of a specified subset of tasks on the client are livelocked. Furthermore, embodiments of the detection module 305 can use techniques other than interfacing with the operating system to determine whether a task is livelocked.

In one embodiment, the detection module 305 determines whether a task is livelocked by periodically inspecting the task to determine whether it is using an inordinate amount of computing resources. For example, the detection module 305 can interface with the operating system to periodically obtain data about (i.e., sample) the resources being consumed by the task at that instant. If the task is consuming an inordinate amount of resources across a set of sequential samples describing the resource consumption over a length of time, the detection module 305 queues the task for additional inspection. The level of resource utilization considered "inordinate" is established using one or more pre-specified thresholds and/or via other techniques. In one embodiment, an "inordinate" amount is most or all of a resource.

For example, in one embodiment the detection module 305 determines whether a task is consuming an inordinate amount of CPU time. The detection module 305 periodically interfaces with the operating system to sample the CPU time consumed by the task. If the task exceeds a threshold amount of CPU time (e.g., 95% of available time from one core of the processor 202), for a threshold number of sequential samples (e.g., 10 samples and/or 30 seconds worth of samples), the detection module 305 places the task in a queue of tasks to be inspected.

Different embodiments of the detection module 305 sample the operating system to determine utilization of other computing resources, and use different thresholds for different resources and/or tasks. Thus, the detection module 305 can use different thresholds for a task known to be a heavy resource consumer than it uses for a task known to be a light resource consumer. In addition, the detection module 305 can use different thresholds for different resources to determine whether to queue the task for additional inspection.

The detection module 305 inspects queued tasks to determine whether the tasks are making tangible progress. The detection module 305 determines whether a task is making progress over the time window of detailed inspection. In this context, "making progress" means working toward a goal, be it analyzing a file for malicious software, playing a video, or saving a file to the storage device 208.

The detection module 305 can use a variety of techniques to determine whether a task is making tangible progress. In one embodiment, the task queued for inspection is associated with a process, and the detection module 305 identifies the busiest thread or threads of the process as part of the inspection. The detection module 305 inspects the register contexts associated with the one or more busiest threads to determine whether the threads are making progress.

In one embodiment, this inspection is performed by sampling the register contents of the thread periodically, and grouping the state of the instruction pointer (i.e., the address of the code in memory the processor 202 is executing) with the state of the data registers. The detection module 305 analyzes the register contents over the multiple samples for evidence that the thread is livelocked.

For example, for a given thread, the detection module 305 may determine whether the contents of multiple registers associated with the thread are changing over time. Generally, the contents of the instruction pointer and data registers should change over time as the processor 202 processes data for the thread. Hence, static register contents are evidence that the thread is not making progress and is therefore livelocked.

Similarly, the detection module 305 may determine whether the contents of only one data register are changing over time as the processor 202 processes data for the thread. This situation often indicates that the thread is using the changing register as a counter. However, if the register is constantly counting but the contents of the other data registers do not change, then the single changing register is evidence that the thread execution is stuck in a counting state and therefore the thread is livelocked.

The detection module 305 may also determine whether the contents of the registers are changing in a cyclical pattern, or in a small set of patterns. Typically, register contents will not follow repeating patterns while the processor 202 processes data for the thread. Repeating patterns are evidence is that the thread execution is stuck in a loop and therefore the thread is livelocked. Other embodiments of the detection module 305 can use other techniques to examine the thread and associated registers for evidence that the thread is livelocked.

The detection module 305 analyzes the information described above to determine whether a task is livelocked. For example, if the detection module 305 identifies a process as consuming an inordinate amount of CPU time, and further analysis of the process shows that the register contents of one of its threads changes in a repeating pattern, the detection module 305 declares the process and thread livelocked. Depending upon the embodiment, the detection module 305 may combine or weight different types of evidence differently when making the livelock determination. Likewise, other embodiments can use different and/or additional techniques to determine whether a task is livelocked.

Furthermore, one embodiment of the detection module 305 uses one or more techniques to mitigate possible false-positive detections of livelocked tasks. In one embodiment, if resource utilization (e.g., processor 202 utilization or CPU time) falls below the livelock threshold at any time during the inspection, the detection module 305 concludes that the task has escaped livelock. Therefore, the detection module 305 discards its current inspection of the task and begins inspecting anew.

In addition, an embodiment of the detection module 305 incorporates the "idleness" of the user of the client 105 when determine whether a task is livelocked. The detection module 305 can use a variety of metrics to determine whether the user is presently using the client 105, such as whether mouse and/or keyboard input has been received within a specified time interval. If the user is not present (i.e., is idle), the livelock of a task is less noticeable. Accordingly, an embodiment of the detection module 305 aborts livelock detection while the user is idle. Another embodiment of the detection module 305 uses different detection thresholds depending upon whether the user is idle. For example, the detection module 305 can use a threshold that specifies a high rate of resource utilization over a greater number of sampling intervals if the user is idle than the number of sampling intervals used if a user is not idle.

The detection module 305 can also incorporate the amount of computing resources available at the client 105 when determining whether a task is livelocked. For example, if the client 105 includes a single-core processor and/or is performing many tasks simultaneously, these conditions might cause the operating system to report misleading resource utilization information. If the client 105 has only a single core processor, the operating system might report that a task is utilizing an inordinate amount of CPU time even though the task is functioning normally. In such circumstances, an embodiment of the detection module 305 adjusts by raising the utilization threshold and/or lowering the utilization rate reported by the operating system.

The data collection module 315 collects data describing a detected livelock event. In general, the data collection module 315 collects data that can be used by an application developer to determine the cause of an application's livelock. The specific types of collected data can vary in different embodiments. The data collection module 315 collects the data by interfacing with the operating system and/or via other techniques. In addition, some of the collected data may be gathered by the detection module 305 in the course of detecting the livelock event.

In one embodiment, the data collection module 315 collects a memory dump describing the state of the livelocked task. The memory dump contains the state of the working memory of the task when the livelock is detected. Thus, it can include the contents of the address space allocated to a process having a livelocked thread. In addition, the memory dump collected by the data collection module 315 may also include the thread times showing the amount of processor resources consumed by the threads of the process. The memory dump may also include handle information describing file handles open at the time of the livelock.

The data collection module 315 may also collect logs from one or more applications executing on the client 105 when the livelock is detected. Many applications maintain logs describing the operations performed by the applications. These logs are useful for determining the cause of a livelock event because they may indicate the specific operation during which the livelock occurred. The data collection module 315 may collect only the log of the application that had the livelocked task or collect logs from multiple different applications executing on the client 105.

An embodiment of the data collection module 315 further collects data describing other tasks executing on the client 105 when the livelock is detected. These data may include a list of running processes and performance data for those processes. For example, the data collection module 315 can collect data describing the processor and/or memory resources consumed by each of the other running processes.

The data collection module 315 may also collect identification data that can be used to uniquely identify the livelock event. These data can include a unique identifier (ID) of the client 105. This ID can be assigned by the reporting module 115 or by another module on the client 105. In one embodiment, the ID is anonymous and allows livelock events from the client 105 to be identified without revealing other information about the client and/or user. The data for identifying the livelock event can also include an identifier of a non-operating system module on the stack of the livelocked thread, the name of the process in which the module on the stack is running (i.e., the process associated with the address space in which the module on the stack is running), and the most common module offset detected on the stack of the module on the stack of the livelocked thread. The data collection module 315 can gather this stack information by, e.g., using stack-walking APIs provided by the operating system.

The report generation module 320 generates and transmits livelock reports to the server 135 via the network 125. A livelock report describes a livelock event detected at the client 105. The livelock report for an event includes all or some of the data collected by the data collection module 315 for that event. The report generation module 320 may transmit the report to the server 135 upon detection of the event, or at other times such as when the client 105 is idle.

In one embodiment, the report generation module 320 generates an ID for the report using the identification data collected by the data collection module 315. This ID may be based on a hash of the identification data. The report generation module 320 may generate the hash using locality-sensitive hashing techniques so that hashes based on similar identification data are similar. Thus, reports from similar livelock events from different clients 105 will have similar IDs. This similarity allows an analyst at the server 135 to group livelock reports based on similarity, which may assist in determining the causes of the livelock events.

The data storage module 325 stores data used by the reporting module 115 during its operation. The stored data can include sample data, thresholds, and inspection data obtained and used by the detection module 305 to detect livelock events. The stored data can also include data describing the livelock events and identification data collected by the data collection module 315, as well as reports generated by the report generation module 320. The data storage module 325 may include a relational or other form of database to enable efficient storage and retrieval of the data. In one embodiment the data storage module 325 stores the data on the storage device 208 of the client 105.

Figure 4:
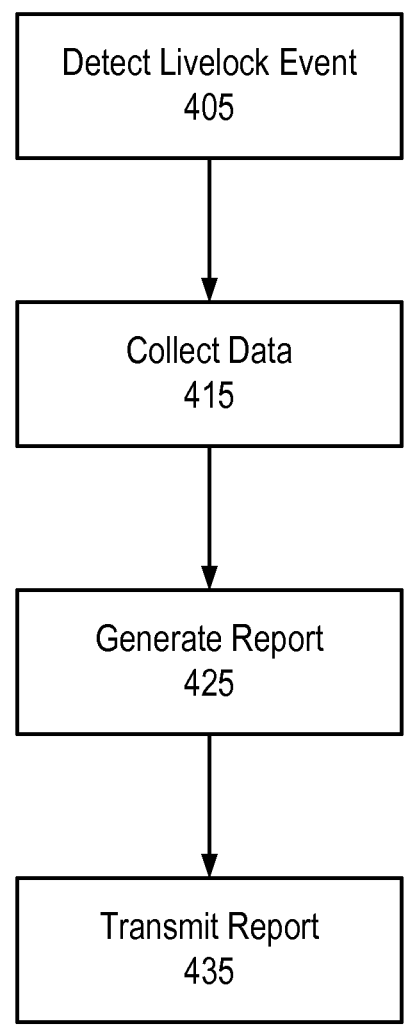
FIG. 4 is a flowchart illustrating a method for reporting a livelock event performed by the reporting module according to one embodiment.

FIG. 4 is a flowchart illustrating a method for reporting a livelock event performed by the reporting module 115 according to one embodiment. Other embodiments can perform the steps of the method in different orders and can include different and/or additional steps. In addition, some or all of the steps can be performed by entities other than the reporting module 115.

The reporting module 115 detects 405 a livelock event by analyzing state information about the client 105 to identify a task executing on the client that is livelocked. This analysis involves periodically inspecting the task to determine whether it is using an inordinate amount of computing resources. The reporting module 115 also determines whether the task is making tangible progress by, e.g., inspecting register contents associated with the task.

If a livelock event is detected, the reporting module 115 collects 415 data describing the livelock event. These data include, e.g., a memory dump describing the state of the livelocked task, logs from one or more applications executing on the client 105, and data describing other tasks executing on the client. The reporting module 115 also collects 415 identification data for uniquely identifying the livelock event. The reporting module 115 generates 425 a livelock report describing the livelock event. In one embodiment, the generated report is identified using a hash generated from the identification data for the livelock event. The reporting module 115 transmits 435 the livelock report to the server 135.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of reporting a livelock event occurring on a computer, comprising:

specifying a threshold amount of a computing resource used to determine whether a task executing on the computer is livelocked in response to past computing resource consumption by the task, wherein different threshold amounts of the computing resource are specified for different tasks;

in response to resource consumption by the task exceeding the threshold amount of the computing resource, detecting a livelock event involving the task executing on the computer by performing at least one inspection from a set of inspections of registers of a processor executing the task to determine that the task is not making tangible progress, the set of inspections consisting of:
 determining whether contents of multiple ones of the registers are changing over time;
 determining whether the registers indicate that the task is stuck in a counting state; and
 determining whether the register contents are changing in a cyclical pattern;
collecting state data describing the detected livelock event;
generating a livelock report including the collected state data; and
transmitting the livelock report to a server.

2. The method of claim 1, wherein detecting the livelock event involving the task executing on the computer comprises:
 detecting that the task is not making tangible progress according to at least one inspection while resource consumption by the task exceeds the threshold amount of the computing resource.

3. The method of claim 1, wherein detecting the livelock event involving the task executing on the computer comprises:
 periodically sampling to determine an amount of the computing resource being consumed by the task to produce sequential samples; and
 performing the at least one inspection in response to determining whether the task consumes more than the threshold amount of the computing resource in each of a threshold number of sequential samples.

4. The method of claim 3, further comprising:
determining whether a user of the computer is idle; and
varying the threshold number of sequential samples responsive to whether the user of the computer is idle.

5. The method of claim 1, wherein collecting state data describing the detected livelock event comprises collecting one or more from the set consisting of:
 a memory dump describing a state of the livelocked task;
 logs from one or more applications executing on the computer when the livelock is detected; and
 data describing other tasks executing on the computer when the livelock is detected.

6. The method of claim 1, wherein generating a livelock report comprises:
 collecting identification data uniquely identifying the livelock event; and
 generating a hash of the identification data, the hash generated such that similar livelock events have similar hashes.

7. A non-transitory computer-readable storage medium storing executable computer program instructions for reporting a livelock event occurring on a computer, the instructions performing steps comprising:
 specifying a threshold amount of a computing resource used to determine whether a task executing on the computer is livelocked in response to past computing resource consumption by the task, wherein different threshold amounts of the computing resource are specified for different tasks;
 in response to resource consumption by the task exceeding the threshold amount of the computing resource, detecting a livelock event involving the task executing on the computer by performing at least one inspection from a set of inspections on registers of a processor executing the task to determine that the task is not making tangible progress, the set of inspections consisting of:
  determining whether contents of multiple ones of the registers are changing over time;
  determining whether the registers indicate that the task is stuck in a counting state; and
  determining whether the register contents are changing in a cyclical pattern;
 collecting state data describing the detected livelock event;
 generating a livelock report including the collected state data; and
 transmitting the livelock report to a server.

8. The storage medium of claim 7, wherein detecting the livelock event involving the task executing on the computer comprises:
 detecting that the task is not making tangible progress according to at least one inspection while resource consumption of the task exceeds the threshold amount of the computing resource.

9. The storage medium of claim 8, wherein detecting the livelock event involving the task executing on the computer comprises:
 periodically sampling to determine an amount of the computing resource being consumed by the task to produce sequential samples; and
 performing the at least one inspection in response to determining whether the task consumes more than the threshold amount of the computing resource in each of a threshold number of sequential samples.

10. The storage medium of claim 7, wherein collecting state data describing the detected livelock event comprises collecting one or more from the set consisting of:
 a memory dump describing a state of the livelocked task;
 logs from one or more applications executing on the computer when the livelock is detected; and
 data describing other tasks executing on the computer when the livelock is detected.

11. The storage medium of claim 7, wherein generating a livelock report comprises:
 collecting identification data uniquely identifying the livelock event; and generating a hash of the identification data, the hash generated such that similar livelock events have similar hashes.

12. A computer system for reporting a livelock event, the computer system comprising:
 a non-transitory computer-readable storage medium storing executable computer program instructions for performing steps comprising:
 specifying a threshold amount of a computing resource used to determine whether a task executing on the computer is livelocked in response to past computing resource consumption by the task, wherein different threshold amounts of the computing resource are specified for different tasks;
 in response to resource consumption by the task exceeding the threshold amount of the computing resource, detecting a livelock event involving the task executing on the computer by performing at least one inspection from a set of inspections on registers of a processor executing the task to determine that the task is not making tangible progress, the set of inspections consisting of:
  determining whether contents of multiple ones of the registers are changing over time;
  determining whether the registers indicate that the task is stuck in a counting state; and determining whether the register contents are changing in a cyclical pattern;

collecting state data describing the detected livelock event;

generating a livelock report including the collected state data;

transmitting the livelock report to a server; and a processor for executing the computer program instructions.

13. The computer system of claim 12, wherein detecting the livelock event involving the task executing on the computer comprises:

detecting that the task is not making tangible progress according to at least one inspection while resource consumption of the task exceeds the threshold amount of the computing resource.

14. The computer system of claim 12, wherein detecting the livelock event involving the task executing on the computer comprises:

periodically sampling to determine an amount of the computing resource being consumed by the task to produce sequential samples; and performing the at least one inspection in response to determining whether the task consumes more than the threshold amount of the computing resource in each of a threshold number of sequential samples.

15. The method of claim 1, further comprising:

determining whether a user of the computer is idle in response to whether a monitored input is received within a specified time interval; and specifying the threshold amount of computing resource used to determine whether the task executing on the computer is livelocked in response to whether the user of the computer is idle.

16. The method of claim 1, further comprising:

determining a number of tasks being performed simultaneously by the processor; and specifying the threshold amount of computing resource used to determine whether the task executing on the computer is livelocked in response to the number of tasks being performed simultaneously by the processor.

17. The storage medium of claim 7, further comprising:

determining whether a user of the computer is idle in response to whether a monitored input is received within a specified time interval; and specifying the threshold amount of computing resource used to determine whether the task executing on the computer is livelocked in response to whether the user of the computer is idle.

18. The storage medium of claim 7, further comprising:

determining a number of tasks being performed simultaneously by the processor; and specifying the threshold amount of computing resource used to determine whether the task executing on the computer is livelocked in response to the number of tasks being performed simultaneously by the processor.

19. The computer system of claim 12, further comprising:

determining whether a user of the computer is idle in response to whether a monitored input is received within a specified time interval; and specifying the threshold amount of computing resource used to determine whether the task executing on the computer is livelocked in response to whether the user of the computer is idle.

20. The computer system of claim 12, further comprising:

determining a number of tasks being performed simultaneously by the processor; and specifying the threshold amount of computing resource used to determine whether the task executing on the computer is livelocked in response to the number of tasks being performed simultaneously by the processor.

* * * * *